(12) United States Patent
Vo

(10) Patent No.: US 10,464,006 B2
(45) Date of Patent: Nov. 5, 2019

(54) FILTER ASSEMBLY

(71) Applicant: PAT TECHNOLOGY SYSTEMS INC., Vaudreuil-Dorion (CA)

(72) Inventor: Chau Thien Vo, Roxboro (CA)

(73) Assignee: PAT TECHNOLOGY SYSTEMS INC., Vaudreuil-Dorion, Quebec (CA)

( * ) Notice: Subject to any disclaimer, the term of this patent is extended or adjusted under 35 U.S.C. 154(b) by 72 days.

(21) Appl. No.: 15/402,617

(22) Filed: Jan. 10, 2017

(65) Prior Publication Data

US 2017/0197172 A1 Jul. 13, 2017

Related U.S. Application Data

(60) Provisional application No. 62/277,072, filed on Jan. 11, 2016.

(51) Int. Cl.
*B01D 46/00* (2006.01)
*B01D 46/48* (2006.01)
(Continued)

(52) U.S. Cl.
CPC ............ *B01D 46/48* (2013.01); *B01D 45/02* (2013.01); *B01D 45/08* (2013.01);
(Continued)

(58) Field of Classification Search
CPC ............... B01D 46/00; B01D 46/0023; B01D 46/0057–0083; B01D 46/24;
(Continued)

(56) References Cited

U.S. PATENT DOCUMENTS 4,105,422 A 8/1978 Kiguchi
4,162,148 A * 7/1979 Furstenberg ........... B01D 45/12
141/256

(Continued)

FOREIGN PATENT DOCUMENTS

DE 102014005177 10/2015
EP 2621641 8/2013
WO 2012121162 9/2012

OTHER PUBLICATIONS

Extended European Search Report dated May 23, 2017.

*Primary Examiner* — T. Bennett McKenzie
(74) *Attorney, Agent, or Firm* — Norton Rose Fulbright Canada

(57) ABSTRACT

A filter including a filter wall extending between first and second opposed ends, the filter wall being tubular and surrounding a filter cavity, the filter wall including filtration material permeable to air so that the filter cavity is in fluid communication with an environment of the filter through the filter wall, a filter inlet defined in the first end and in fluid communication with the filter cavity, and a tray extending within the filter cavity and freely rotatable within the filter cavity about an axis of rotation extending longitudinally within the filter cavity, the tray having a center of gravity offset from the axis of rotation, the tray being radially inwardly spaced from the filter wall, the tray being radially outwardly spaced from the filter inlet. A filter module including such a filter and a method of protecting a horizontally extending tubular filter wall from debris are also discussed.

10 Claims, 9 Drawing Sheets

(51) Int. Cl.
  *B01D 46/24* (2006.01)
  *B01D 45/02* (2006.01)
  *B01D 45/08* (2006.01)
  *B01D 50/00* (2006.01)

(52) U.S. Cl.
  CPC ......... *B01D 46/0023* (2013.01); *B01D 46/24* (2013.01); *B01D 46/2403* (2013.01); *B01D 50/002* (2013.01); *B01D 2267/40* (2013.01)

(58) Field of Classification Search
  CPC .... B01D 46/2403; B01D 46/26; B01D 46/48; B01D 46/103; B01D 45/00; B01D 45/02; B01D 45/08; B01D 50/002; B01D 2267/40
  USPC .................................. 55/282–305, 432, 433
  See application file for complete search history.

(56) References Cited

U.S. PATENT DOCUMENTS

| | | |
|---|---|---|
| 4,312,748 A | 1/1982 | Rozmus |
| 5,147,427 A | 9/1992 | Abbot et al. |
| 5,281,246 A | 1/1994 | Ray et al. |
| 6,979,359 B2 | 12/2005 | Laiti |
| 7,314,495 B2 | 1/2008 | Dullien et al. |
| 8,580,008 B2 | 11/2013 | Ota |
| 2004/0262241 A1 | 12/2004 | Socha |

\* cited by examiner

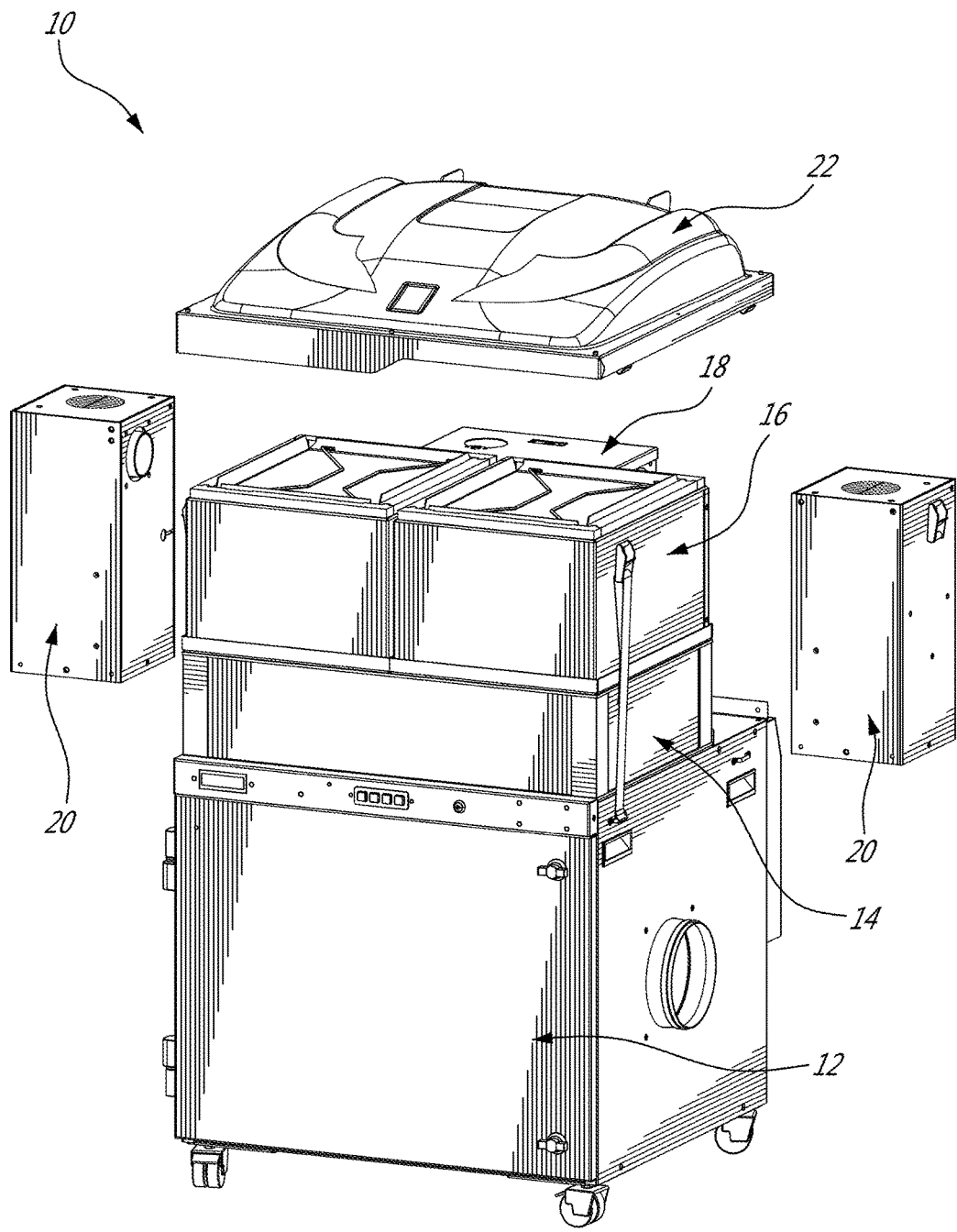

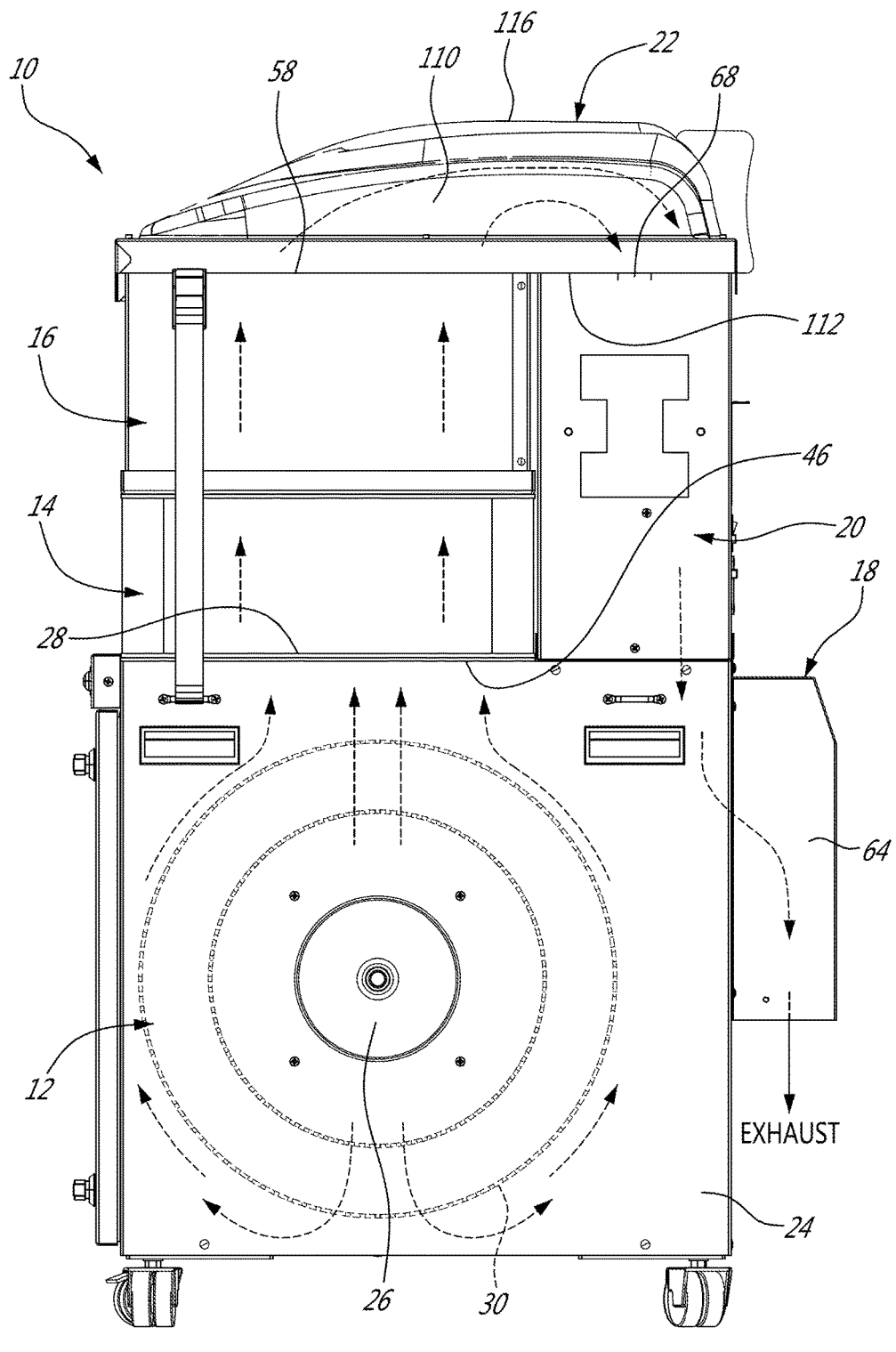

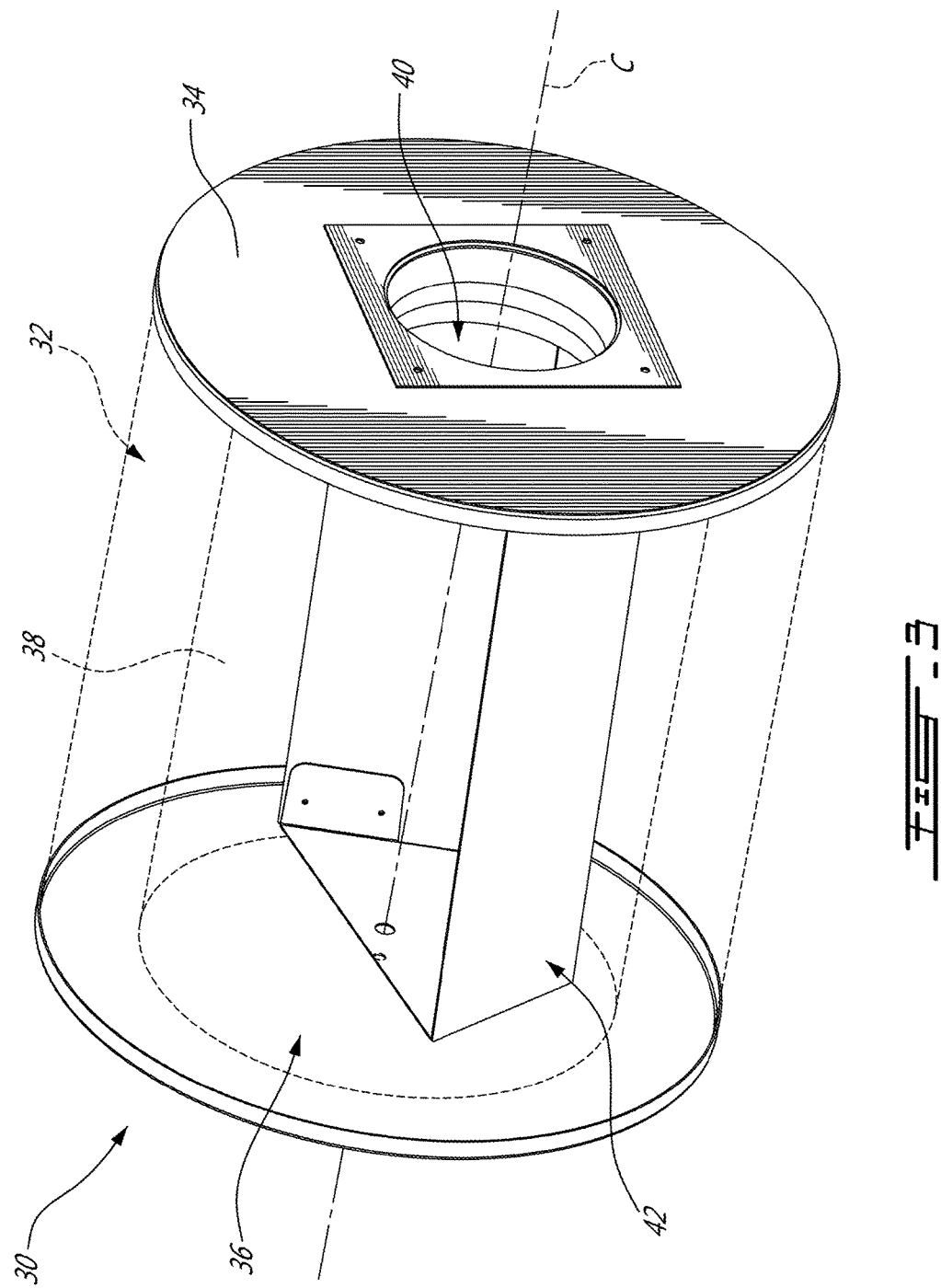

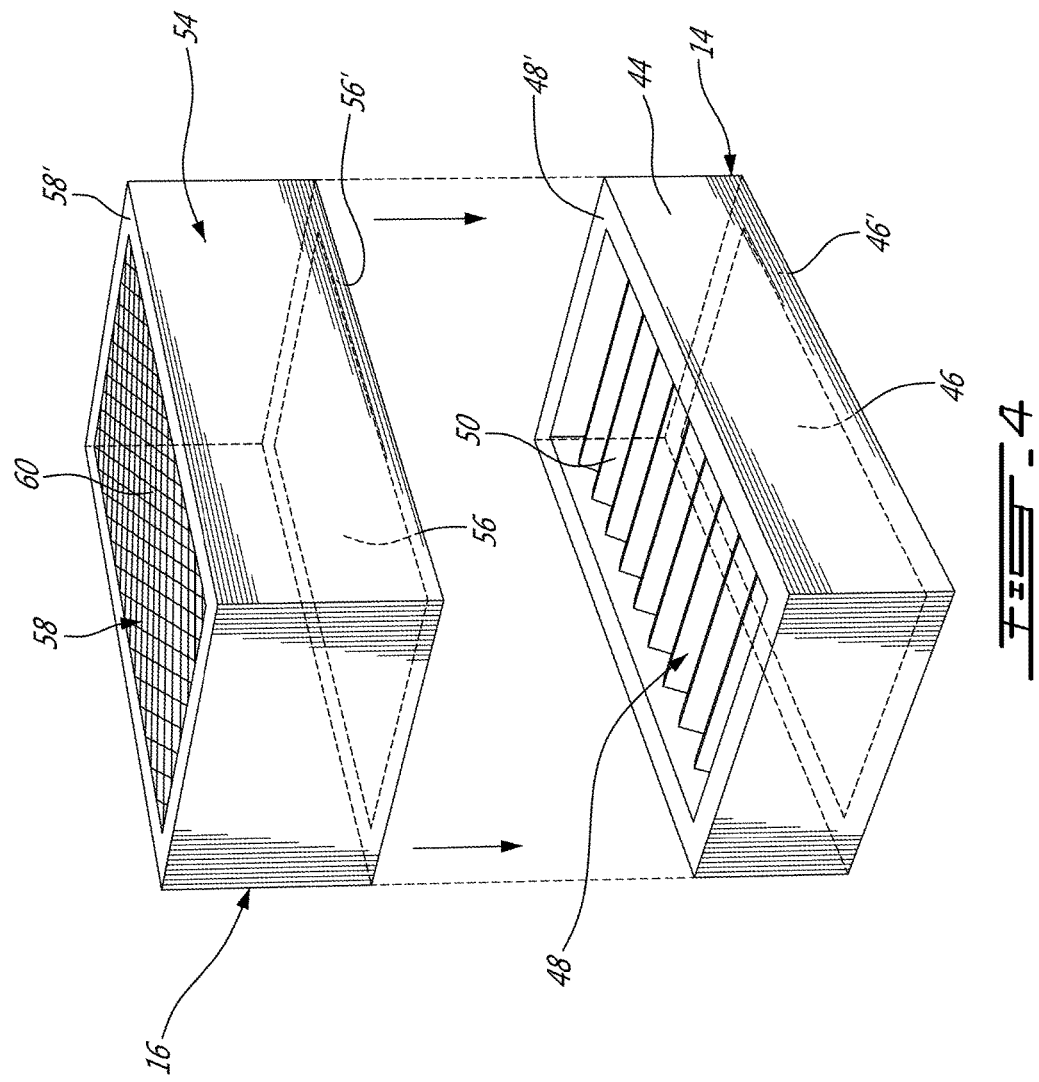

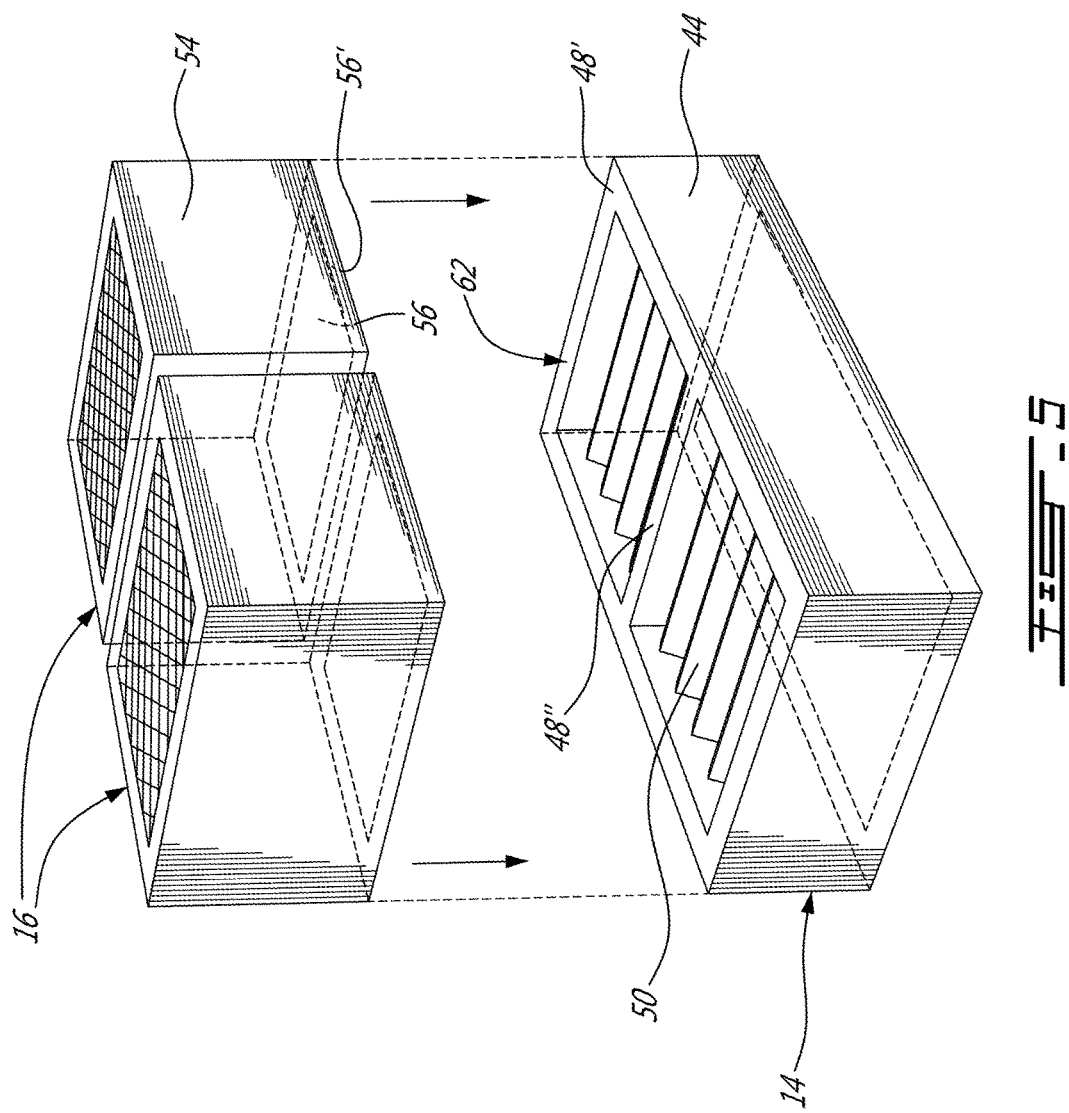

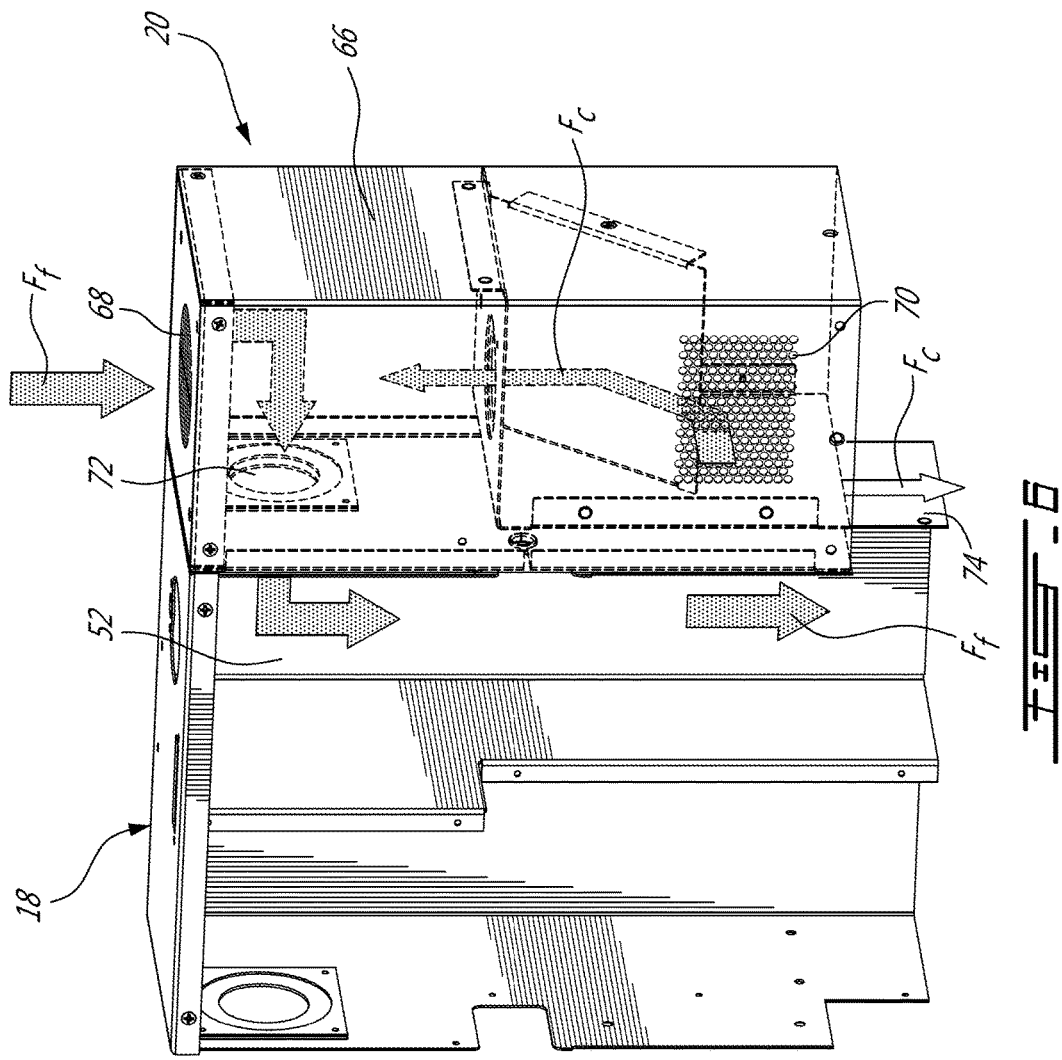

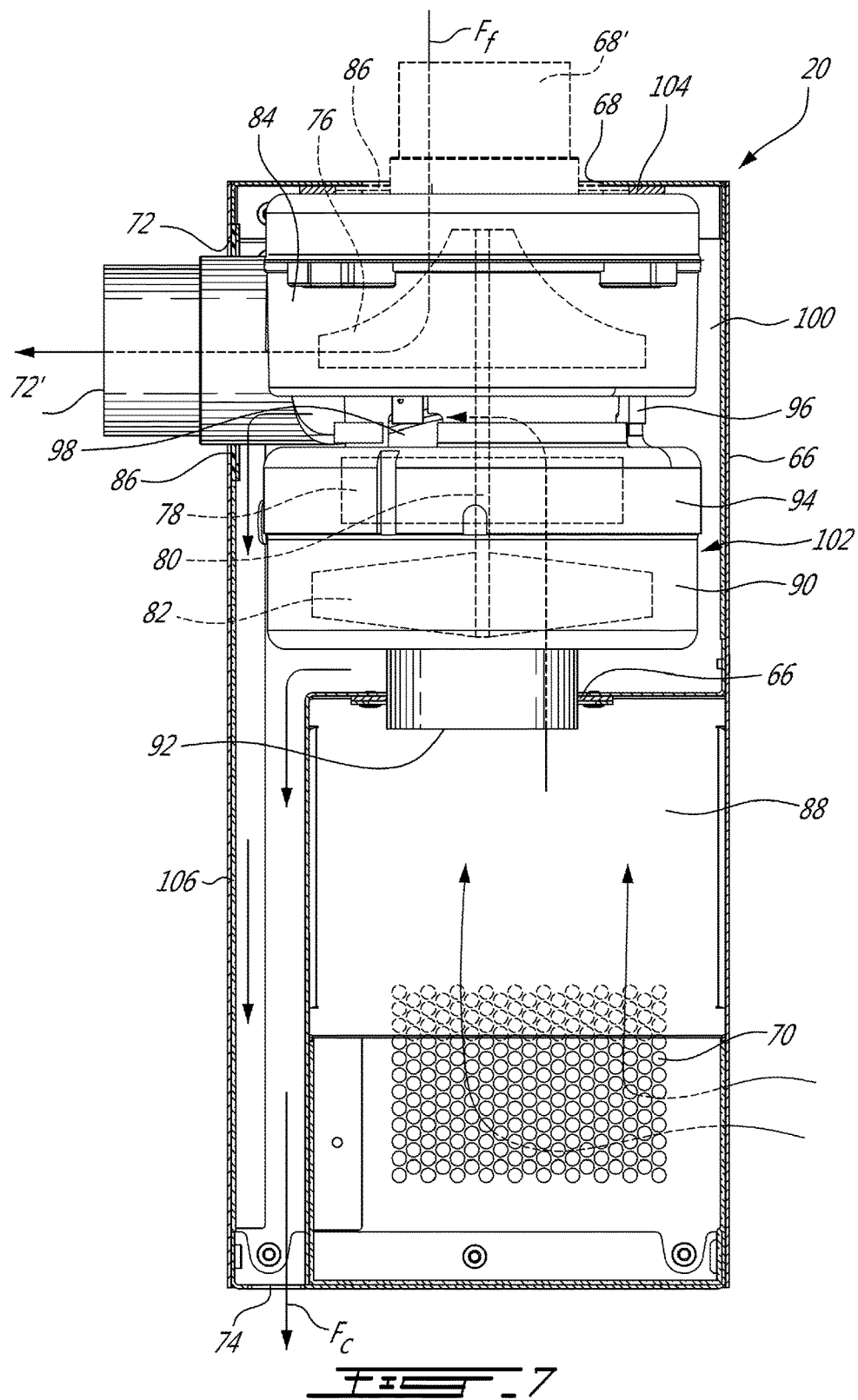
TIE_7

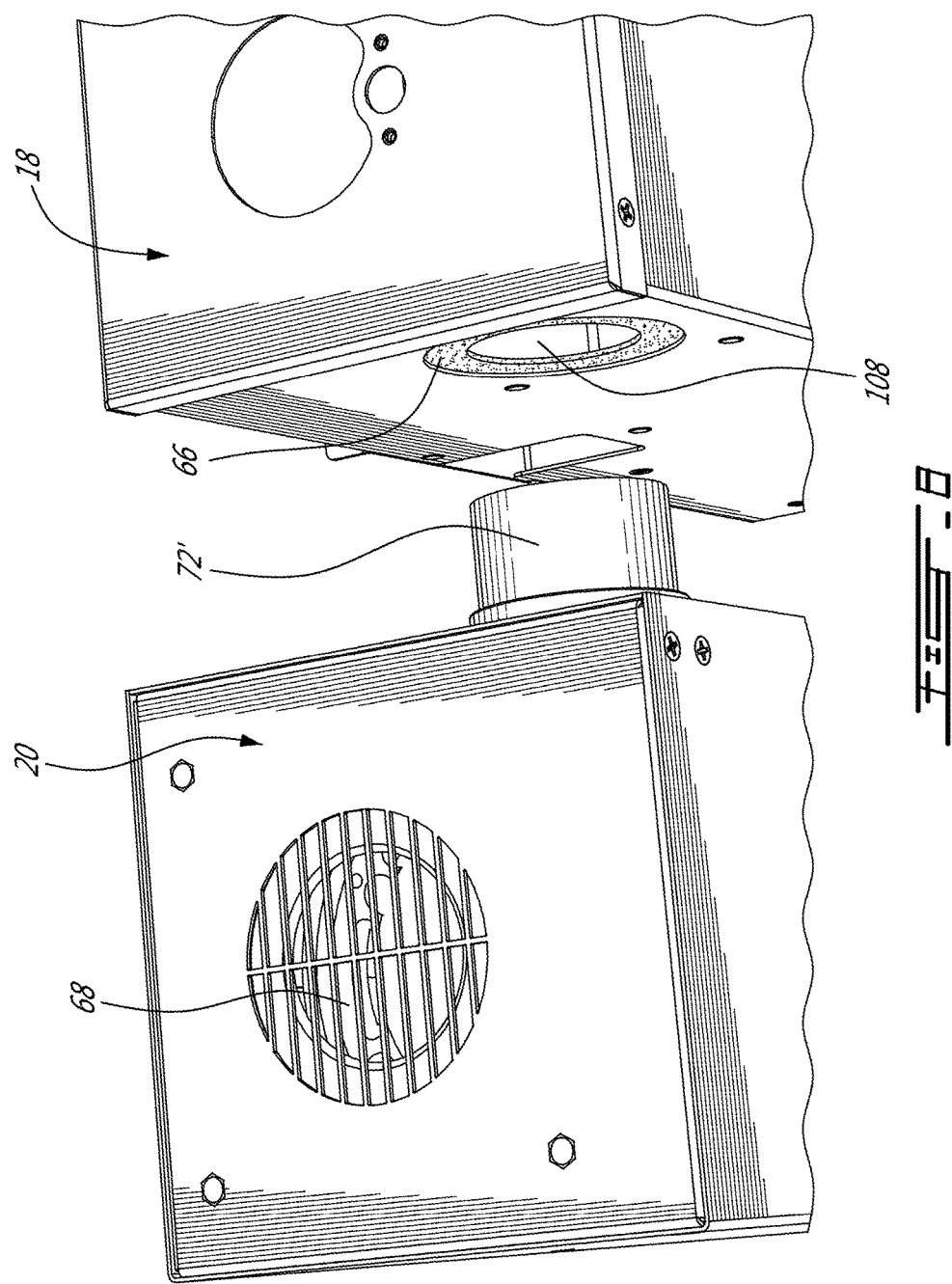

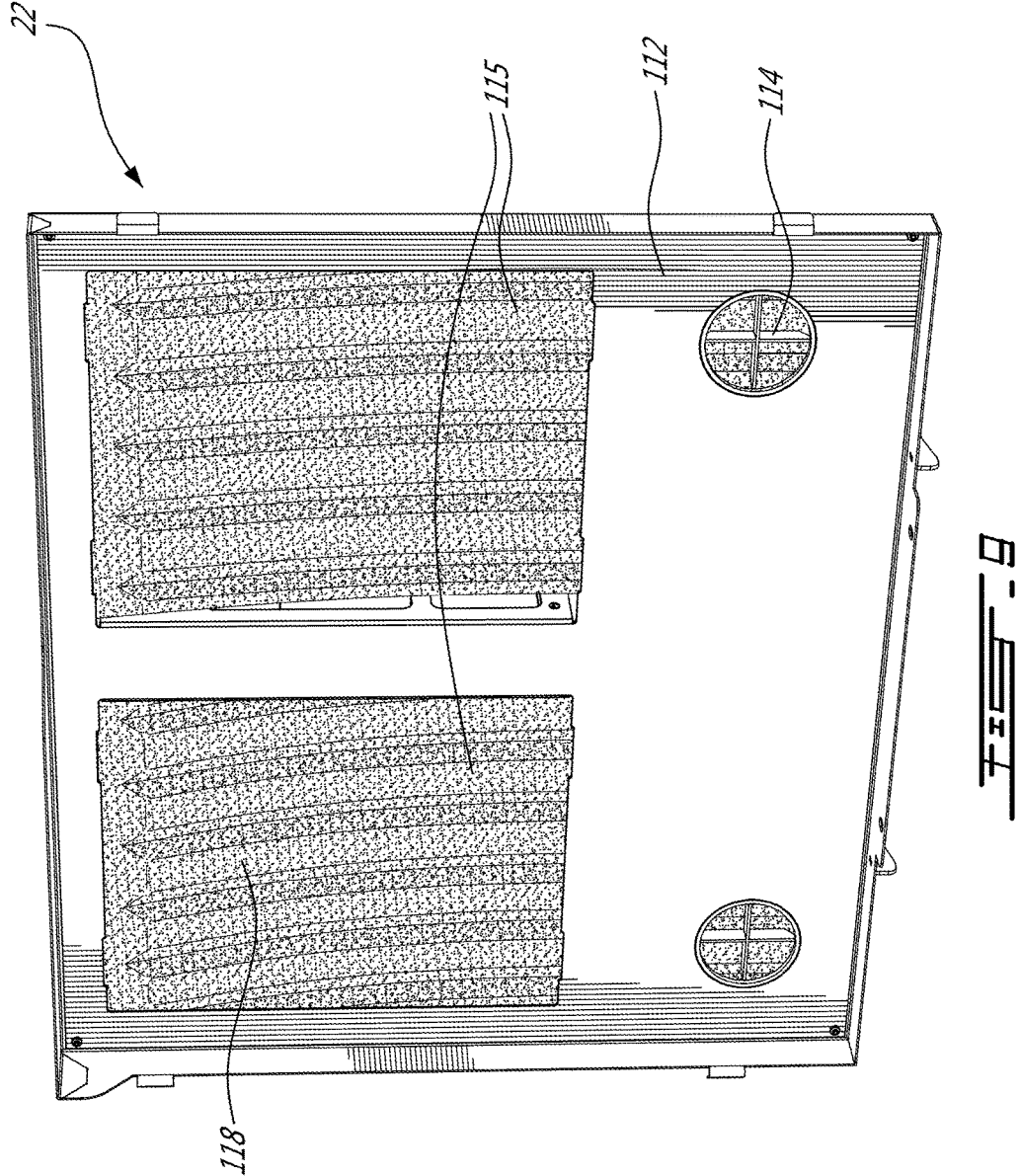

FILTER ASSEMBLY

CROSS-REFERENCE TO RELATED APPLICATIONS

This application claims priority from U.S. provisional application No. 62/277,072 filed on Jan. 11, 2016, the entire contents of which are incorporated by reference herein.

TECHNICAL FIELD

The application relates generally to filter assemblies, more particularly to various elements of such assemblies.

BACKGROUND OF THE ART

A number of problems exist with respect to current filter assemblies.

For example, fine particle filters directly receiving the contaminated flow are susceptible to being clogged and/or damaged when large dust particles or aggregates or debris are present in the contaminated flow, which may require the filters to be changed before its filtration media is saturated by the fine contaminants. Moreover, hot debris may cause a fire hazard when received against some types of filtration material.

Moreover, in gaseous filters using adsorption media such as activated carbon, the concentration of gaseous contaminants to be filtered may be such that the volume of adsorption media required may be sufficiently heavy so as to become burdensome and/or dangerous to manipulate by a person without the assistance of additional people and/or lifting equipment. Accordingly, replacement of filter cartridges may cause significant maintenance costs and/or downtime.

In addition, most filter assembly blowers are mounted to the remainder of the filter assembly with hoses with clamps or seals and fastening systems to connect the flow of filtration air and cooling air which need to be channelled to the appropriate sections of the filter assembly, and retained using threaded fasteners pressing the blower casing against a compression seal. The fasteners typically require a specific torque to ensure proper sealing while preventing over-compression of the seals and/or crushing of the blower impeller enclosure. Accordingly, most filtration system blowers require a qualified technician to perform their removal or replacement, which may cause significant maintenance costs and downtime. Moreover, such requirements typically make it difficult or prohibitive to change the number of blowers used in the field when flow requirements change.

Further, the interaction between the blower(s) and a filter may cause preferential loading in the filter: the filter contamination is formed with a cone shape extending from the blower, thus causing premature saturation of the filtration media within the cone shape, which may decrease the useful life of the filter.

SUMMARY

In one aspect, there is provided a filter module comprising: a casing defining an inlet and an outlet, and an enclosure in fluid communication with the outlet; a filter including a filter wall extending between first and second opposed ends, the filter wall being tubular and disposed horizontally within the casing, the filter wall surrounding a filter cavity, the filter wall including filtration material permeable to air so that the filter cavity is in fluid communication with the enclosure through the filter wall, the filter having a filter inlet defined in the first end, the filter cavity in fluid communication with the inlet of the casing through the filter inlet; and a tray extending within the filter cavity and freely rotatable within the filter cavity about an axis of rotation extending horizontally, the tray having a center of gravity offset from the axis of rotation so has to have a rest position where the tray is located in a bottom portion of the filter cavity, the tray being radially inwardly spaced from the filter wall, the tray being radially outwardly spaced from the filter inlet.

In another aspect, there is provided a filter comprising: a filter wall extending between first and second opposed ends, the filter wall being tubular and surrounding a filter cavity, the filter wall including filtration material permeable to air so that the filter cavity is in fluid communication with an environment of the filter through the filter wall; a filter inlet defined in the first end and in fluid communication with the filter cavity; and a tray extending within the filter cavity and freely rotatable within the filter cavity about an axis of rotation extending longitudinally within the filter cavity, the tray having a center of gravity offset from the axis of rotation, the tray being radially inwardly spaced from the filter wall, the tray being radially outwardly spaced from the filter inlet.

In particular embodiments, the filter module and/or the filter described above may include any one or any combination of the following:

the axis of rotation corresponds to a central axis of the filter wall;
the tray is rotationally engaged to the second end;
the tray is removably connected within the filter cavity;
the tray is cantilevered from the second end;
the tray is permeable to air, or impermeable to air;
the tray is made of metal;
the tray includes perforations.

In another aspect, there is provided a method of protecting a horizontally extending tubular filter wall from debris, the method comprising: providing a tray within a filter cavity surrounded by the tubular filter wall, the tray being configured to receive the debris; and maintaining the tray between an end inlet of the filter cavity and a bottom portion of the tubular filter wall by allowing free rotation of the tray about a horizontal axis offset from a center of gravity of the tray.

In a particular embodiment, the allowed rotation is defined about a central axis of the tubular filter wall.

In another aspect, there is provided a filter assembly comprising: a first filter module including a first casing defining a first enclosure containing first filtration media, the first casing having a first open end in fluid communication with the first enclosure and with the first filtration media; a face divider engaged to the first casing, the face divider including a first perimeter surface extending around a perimeter of the first open end, and at least one divider surface extending between opposed portions of the first perimeter surface across the first open end; at least two second filter modules, each of the second filter modules including: a second casing defining a second enclosure containing second filtration media, the second casing having a second open end in fluid communication with the second enclosure and with the second filtration media, the second casing including a second perimeter surface extending around a perimeter of the second open end; wherein the second perimeter surface of each of the at least two second filter modules is sealingly engaged to the face divider through sealing engagement with a respective portion of the first perimeter surface and with a respective portion of a corresponding one of the at least one divider surface, each second open end being in fluid communication with the first open end.

In particular embodiments, such a filter assembly may include any one or any combination of the following:
the first open end is an outlet, and the second open end of each of the second filter modules is an inlet;
the first filtration media is different from the second filtration media;
the first filter module is a particulate filter and the first filtration media is a particulate filtration media;
each of the second filter modules is an activated carbon filter and the second filtration media includes activated carbon;
the face divider forms part of the first casing which is monolithic, or the face divider is removably connected to the first casing;
the at least two second filter modules include only two second filter modules positioned side by side, and the at least one divider surface includes a single divider surface engaging the second perimeter surface of the two second filter modules.

In another aspect, there is provided a filter assembly comprising: a first filter module including a first casing defining a first enclosure containing first filtration media, the first casing having a first inlet and a first outlet in fluid communication with each other through the first filtration media; a face divider engaged to the first casing, the face divider including a first perimeter surface extending around a perimeter of the first outlet, and a divider surface extending across the first outlet to divide the first outlet; a second filter module including a second casing defining a second enclosure containing second filtration media, the second casing having a second inlet and a second outlet in fluid communication with each other through the second filtration media; a third filter module including a third casing defining a third enclosure containing third filtration media, the third casing having a third inlet and a third outlet in fluid communication with each other through the third filtration media; wherein each of the second and third inlets is sealingly engaged around a perimeter thereof with a respective portion of the first perimeter surface and of the divider surface so that the first outlet is in fluid communication with the second and third inlets.

In particular embodiments, such a filter assembly may include any one or any combination of the following:
the second and third filtration media are identical;
the first filtration media is different from the second filtration media and from the third filtration media;
the first filter module is a particulate filter and the first filtration media is a particulate filtration media;
each of the second and third filter modules is an activated carbon filter, the second and third filtration media including activated carbon;
the face divider forms part of the first casing which is monolithic, or the face divider is removably connected to the first casing.

In another aspect, there is provided a filter assembly comprising: a filter module including a first casing and a filter contained in the casing, the casing having an inlet and an outlet in fluid communication with each other through the filter; a fan module detachable from the assembly, the fan module including a second casing separate from the first casing, first and second rotatable fans, and at least one motor, wherein: the second casing has a filtration flow inlet, a cooling inlet, a filtration flow outlet and a cooling outlet; separate filtration and cooling flow paths are defined within the second casing, the filtration flow path providing fluid communication between the filtration flow inlet and the filtration flow outlet and being in fluid communication with the outlet of the filter module, the cooling flow path providing fluid communication between the cooling inlet and the cooling outlet; the first rotatable fan is received in the second casing in fluid communication with the filtration flow path to drive a flow through the filter; the second rotatable fan is received in the second casing in fluid communication with the cooling flow path; and the at least one motor is received in the second casing in heat exchange relationship with the cooling flow path, each of the first and second rotatable fans being drivingly engaged to one of the at least one motor.

In particular embodiments, such a filter assembly may include any one or any combination of the following:
the first rotatable fan is a blower including a rotatable centrifugal impeller;
the second rotatable fan is an axial fan;
the at least one motor is located in the cooling flow path;
the at least one motor is a single motor, the first and second rotatable fans being mounted to a same shaft drivingly engaged to the motor;
the filtration flow path includes a filtration fan enclosure containing the first rotatable fan;
the fan enclosure includes inlet and/or outlet ducts in fluid communication with the first rotatable fan, the inlet duct extending out of the filtration flow inlet with the filtration flow inlet being sealingly engaged around the inlet duct, the outlet duct extending out of the filtration flow outlet with the filtration flow outlet being sealingly engaged around the outlet duct;
the filtration fan enclosure is connected to the second casing, a compression seal being compressed between an outer surface of the filtration fan enclosure and an inner surface of the second casing around the filtration flow inlet;
the cooling flow path includes a cooling fan enclosure containing the second rotatable fan, and a motor enclosure containing the at least one motor, the cooling fan enclosure and motor enclosure being in fluid communication with each other;
the cooling flow path includes a cooling fan enclosure containing the second rotatable fan, a motor enclosure containing the at least one motor and in fluid communication with the cooling fan enclosure, and an exhaust duct in fluid communication with the motor enclosure, the exhaust duct connected to the filtration fan enclosure without being in fluid communication therewith;
the assembly includes an exhaust casing separate from the first and second casings, the exhaust casing interconnecting the first and second casings, the exhaust casing having an exhaust inlet and an exhaust outlet in fluid communication with each other through the exhaust casing, the filtration flow outlet being detachably engaged to the exhaust inlet.

In another aspect, there is provided a fan module for a filter assembly, the fan module comprising: a casing having a filtration flow inlet, a cooling inlet, a filtration flow outlet and a cooling outlet, separate filtration and cooling flow paths being defined within the casing, the filtration flow path providing fluid communication between the filtration flow inlet and the filtration flow outlet, the cooling flow path providing fluid communication between the cooling inlet and the cooling outlet; a first rotatable fan received in the casing in fluid communication with the filtration flow path; a second rotatable fan received in the casing in fluid communication with the cooling flow path; and at least one motor received in the casing in heat exchange relationship with the cooling flow path, each of the first and second rotatable fans being drivingly engaged to one of the at least one motor.

In particular embodiments, the fan module may include any one or any combination of the following:
the first rotatable fan is a blower including a rotatable centrifugal impeller;
the second rotatable fan is an axial fan;
the at least one motor is located in the cooling flow path;
the at least one motor is a single motor, the first and second rotatable fans being mounted to a same shaft drivingly engaged to the motor;
the filtration flow path includes a filtration fan enclosure containing the first rotatable fan;
the fan enclosure includes inlet and/or outlet ducts in fluid communication with the first rotatable fan, the inlet duct extending out of the filtration flow inlet with the filtration flow inlet being sealingly engaged around the inlet duct, the outlet duct extending out of the filtration flow outlet with the filtration flow outlet being sealingly engaged around the outlet duct;
the filtration fan enclosure is connected to the casing, a compression seal being compressed between an outer surface of the filtration fan enclosure and an inner surface of the casing around the filtration flow inlet;
the cooling flow path includes a cooling fan enclosure containing the second rotatable fan, and a motor enclosure containing the at least one motor, the cooling fan enclosure and motor enclosure being in fluid communication with each other;
the cooling flow path includes a cooling fan enclosure containing the second rotatable fan, a motor enclosure containing the at least one motor and in fluid communication with the cooling fan enclosure, and an exhaust duct in fluid communication with the motor enclosure, the exhaust duct connected to the filtration fan enclosure without being in fluid communication therewith.

In another aspect, there is provided a filter assembly comprising: a filter module including a first casing and a filter contained in the first casing, the first casing defining an inlet and an outlet in fluid communication with each other through the filter; a fan module including a second casing separate from the first casing, a rotatable fan contained in the second casing, and a motor drivingly engaged to the rotatable fan, the fan module defining a fan module inlet, a fan module outlet, and a filtration flow path providing fluid communication between the fan module inlet and the fan module outlet, the fan being in fluid communication with the filtration flow path; wherein the fan module inlet and the outlet of the filter module are spaced apart from one another; a communication enclosure defining a plenum providing a fluid communication between the outlet of the filter module and the fan module inlet, the plenum directing a flow between the outlet of the filter module and the fan module inlet along a direction different from a direction of the flow through the fan module inlet and from a direction of the flow through the filter.

In particular embodiments, such a filter assembly may include any one or any combination of the following:
the flow through the fan module inlet and through the filter is vertical or substantially vertical;
the fan module inlet is located on a top surface of the second casing and the outlet of the filter module is located on a top surface of the first casing, the first and second casing being side-by-side, the plenum directing the flow horizontally or substantially horizontally;
the communication enclosure is provided by a removable cover overlaying the top surfaces of the first and second casing;
the cover includes a bottom panel having a hole aligned with the fan module inlet and an opening aligned with the outlet of the filter module, and an arcuate top wall, the plenum being defined between the bottom panel and the arcuate top wall;
the plenum includes a noise reducing material permeable to air, and may be filled with the noise reducing material;
the filter includes adsorption filtration media, which may include activated carbon.

In a further aspect, there is provided a method of reducing preferential loading within an adsorption filter, the method comprising: pulling a flow through the adsorption filter with a fan, including: circulating the flow through the adsorption filter; changing a direction of the flow by directing the flow through a plenum in fluid communication with an outlet of the adsorption filter; and further changing the direction of the flow from the plenum to the fan.

In particular embodiments, this method may include any one or any combination of the following:
the flow through the fan and through the adsorption filter is vertical or substantially vertical;
the fan and filter are located in side-by-side casings and the flow is directed through the plenum horizontally or substantially horizontally;
directing the flow through the plenum includes directing the flow through a removable cover overlaying the side-by-side casings;
directing the flow through the plenum includes circulating the flow through a noise reducing material permeable to air;
circulating the flow through the adsorption filter includes circulating the flow through activated carbon;
directing the flow through the plenum includes diffusing the flow.

The above aspects may be used in a filter assembly independently of one another. Any combination of any number of the above aspects may also be used in a same filter assembly. In a particular embodiment, a filter assembly includes all of the above aspects.

DESCRIPTION OF THE DRAWINGS

Reference is now made to the accompanying figures in which:

FIG. 1 is a schematic tridimensional exploded view of a filter assembly in accordance with a particular embodiment;

FIG. 2 is a schematic side view of the filter assembly of FIG. 1, showing a filtration flow therethrough;

FIG. 3 is a schematic tridimensional view of a pre-filter in accordance with a particular embodiment, which may be used in the filter assembly of FIG. 1 or in any other adequate type of filter assembly;

FIG. 4 is a schematic tridimensional view of a particulate filter module and of a gaseous filter module in accordance with a particular embodiment, which may be used in the filter assembly of FIG. 1 or in any other adequate type of filter assembly;

FIG. 5 is a schematic tridimensional view of a particulate filter module and of gaseous filter modules in accordance with another particular embodiment, which may be used in the filter assembly of FIG. 1 or in any other adequate type of filter assembly;

FIG. 6 is a schematic tridimensional transparent view of a casing of a fan module and of part of an exhaust module in accordance with a particular embodiment, which may be used in the filter assembly of FIG. 1 or in any other adequate type of filter assembly;

FIG. 7 is a schematic cross-sectional view of a fan module with the casing of FIG. 6 and a fan assembly in accordance with a particular embodiment received therein;

FIG. 8 is a schematic tridimensional view of part of the fan module of FIG. 7, showing an outlet duct thereof adjacent a complementary port of the exhaust module of FIG. 6; and FIG. 9 is a schematic bottom view of a cover in accordance with a particular embodiment, which may be used in the filter assembly of FIG. 1 or in any other adequate type of filter assembly.

DETAILED DESCRIPTION

Referring to FIG. 1, a particular embodiment of a filter assembly 10 is shown. The filter assembly 10 is used to capture particulate and/or undesirable gases (e.g. toxics gases, undesirable odors, volatile organic compounds). The filter assembly 10 may be used to filter the environment of a laser marking/engraving process, a printing press, etc. Other uses are also possible.

The filter assembly 10 includes several interconnected modules: a pre-filter module 12, a particulate filter module 14, a gaseous filter module 16, an exhaust module 18, and one or more fan modules 20 (two being shown). A cover 22 is also disposed over the fan modules 20, exhaust module 18 and gaseous filter module 16, which are located side-by-side; the pre-filter module 12, particulate filter module 14 and gaseous filter module 16 are disposed one over the other. The fan modules 20 are detachably interconnected to the other modules 12, 14, 16, 18. In a particular embodiment, all of the modules 12, 14, 16, 18, 20 are detachably interconnected such as to be removable from the assembly 10.

Referring to FIG. 2, a filtration or working air flow of the assembly 12 is defined through, in order, the pre-filter module 12, the particulate filter module 14, the gaseous filter module 16, the fan modules 20, and the exhaust module 18, as will be further detailed below.

The pre-filter module 12 has a casing 24 and an inlet 26 which is in fluid communication with the source of the contaminated flow to be filtered; such fluid communication may be obtained through any type of appropriate structure (not shown). The casing 24 also has an outlet 28 which is in fluid communication with an inlet 46 of the particulate filter module 14. The outlet 28 of the pre-filter module 12 has a shape and area corresponding to that of the inlet 46 of the particulate filter module 14, and the two modules 12, 14 are sealingly engaged to one another such that the entire flow exiting from the outlet 28 of the pre-filter module 12 enters the inlet 46 of the particulate filter module 14.

The casing 24 defines an enclosure in fluid communication with the outlet 28, and a pre-filter 30 is received in the enclosure. In a particular embodiment and referring to FIG. 3, the pre-filter 30 has a tubular filter wall 32 extending between opposed ends 34, 36, with the filter wall 32 disposed horizontally within the casing 24, i.e. having a central axis C extending horizontally within the casing 24. A filter cavity 38 is defined by and surrounded by the filter wall 32. The filter wall 32 is made of filtration material permeable to air (e.g. paper-like or plastic-sheet pleated filtration material) so that the filter cavity 38 is in fluid communication with the surrounding enclosure through the tubular filter wall 32.

A filter inlet 40 is defined at the center of one of the ends 34 of the pre-filter 30, in alignment with and in fluid communication with the inlet 26 of the casing 24. In the embodiment shown, the other end 36 of the pre-filter 30 is closed and impermeable to air. For example, in a particular embodiment, the closed end 36 is defined by a metal cap, and the open end 34 including the inlet is defined by a metal ring, both adhered to the filter wall 32 using any type of suitable adhesive, such as for example urethane glue; other materials may alternately be used. The flow enters the filter cavity 38 through the inlet 40, and then circulates to the enclosure surrounding the filter wall 32 by passing through the filter wall 32 around its circumference. The flow then circulates out of the outlet 28 of the casing 24 into the particulate filter module 14 (see FIG. 2).

In the embodiment shown, the pre-filter 30 further includes a debris tray 42 extending within the filter cavity 38 across its length and rotationally engaged to the closed end 36 of the pre-filter 30, for example through a bearing attachment. The rotational connection with the closed end 36 allows the tray 42 to be freely rotatable within the filter cavity 38 about a horizontal axis of rotation extending longitudinally within the filter cavity 38, which in the embodiment shown corresponds to the central axis C. The center of gravity of the tray 42 is offset from the axis of rotation (central axis C) so that under the action of gravity, the tray 42 has a rest position along the bottom of the filter cavity 38, i.e. the rest position of the tray 42 corresponds to its lowermost position within the filter cavity 38, regardless of any rotation of the pre-filter 30 about the central axis C.

In the particular embodiment shown, the tray 42 has a flat bottom wall and flat side walls extending from the bottom wall to form a substantially U-shaped cross-section; the bottom wall may be angled with respect to the central axis C, so that that the tray 42 has a downward slope in a direction moving away from the inlet 40. Other configurations are alternately possible. For example, the tray 42 may be curved, and defined by or including a tray wall having a shape corresponding to an arc concentric to the filter wall 32. The tray 42 is radially inwardly spaced from the filter wall 32, so that air can circulate therebetween. The tray 42 is also radially outwardly spaced from the inlet 40, such that all the flow from the inlet 40 enters the filter cavity 38 radially inwardly of (i.e., "over") the tray 42. The tray 42 may be permeable to air, or may alternately be impermeable to air; for example, the tray 42 may be made of solid material, perforated material or mesh. If mesh or perforated material is used, the degree of perforation is selected based on the potential size of the debris the tray 42 is intended to catch, depending on the application.

The material of the tray 42 is preferably heavy enough to cause the tray 42 to rotate about its axis of rotation under its own weight, so as to maintain its lower position within the filter cavity 38, for example when the pre-filter 30 is rolled into place within the casing 24. If lighter material is used, an extra weight may be attached to the tray 42, offset from the axis of rotation, to facilitate the rotation of the tray 42 toward the lowermost position. In a particular embodiment, the tray 42 is made from solid aluminum sheet material. Alternately, any metal rigid enough to maintain the shape of the tray may be used. The tray 42 may also be made of any suitable type of plastic material; a heat resistant and/or flame retarding plastic is preferably used, particularly for applications where the debris is potentially hot and/or burning.

In use, the flow slows down after entering the filter cavity 38, for example by having the filter cavity 38 defining a larger diameter than that of the inlet 40. The heavier particles of dust and debris fall because of the drop of speed in the air. Because of its rotational support, the tray 42 is self positionable under the action of gravity such as to always be located along the bottom of the pre-filter 30 even if it rotates; at least a portion and preferably all of the dust and debris falling out of the flow thus fall on the tray 42. The tray 42 does not touch the filter wall 32, and air can circulate between the tray 42 and the filter wall 32. In a particular embodiment, the tray 42 catches the falling large particles that may block the pre-filter 30, and/or the hot debris that may cause a fire in the pre-filter 30, such as to increase the life of the pre-filter 30; accordingly, the tray 42 is preferably made of material more resistant to heat than the filter wall 32. In a particular embodiment, the tray 42 is removably connected to the closed end 36 of the pre-filter 30 such as to facilitate maintenance.

Although in the embodiment shown the tray 42 is cantilevered from the closed end 36, it is understood that it may also be suitably attached to the open end 34 of the pre-filter (in a cantilevered fashion or together with attachment to the closed end 36), provided such connection allows the free rotation of the tray 42 such that it remains self-positioning along the bottom of the filter cavity 38.

It is also understood that the rotationally supported tray 42 may be provided in cylindrical filters other than the pre-filter 30 shown.

Referring to FIG. 4, the particulate filter module 14 has a casing 44 defining an enclosure, and an inlet and outlet 46, 48 communicating with this enclosure. The inlet and outlet 46, 48 are defined by opposed surfaces of the filter module 14, and preferably correspond to the entire area of these surfaces with the exception of a respective relatively small perimeter surface 46', 48' surrounding each of the inlet and outlet 46, 48. The perimeter surface 46' surrounding the inlet 46 of the particulate filter module 14 is sealingly engaged to a perimeter surface (not shown) surrounding the outlet 28 of the pre-filter module 12 (see FIG. 2), and the perimeter surface 48' surrounding the outlet 48 of the particulate filter module 14 is sealingly engaged to a perimeter surface 56' surrounding an inlet 56 of the gaseous filter module 16. The outlet 48 of the particulate filter module 14 is thus in fluid communication with the inlet 56 of the gaseous filter module 16, and the two modules 14, 16 are sealingly engaged to one another such that the entire flow exiting from the outlet 48 of the particulate filter module 14 enters the inlet 56 of the gaseous filter module 16.

The casing 44 of the particulate filter module 14 defines an enclosure in fluid communication with the inlet 46 and outlet 48, and containing suitable particulate filtration media 50 such as for example a porous material or membrane (e.g. pleated glass fibre media) where the particulates are captured between the fibers of the media. In a particular embodiment, the particulate filtration media 50 defines a high-efficiency particulate arrestance (HEPA) filter; other suitable particulate filtration media may alternately be used, including particulate media having different levels of filtrations adequate to the particular flow being filtered. In a particular embodiment, the particulate filtration media 50 is provided in a cartridge where the particulate filtration media 50 is engaged to and surrounded by rigid outer walls (made for example of aluminum), and these outer walls define the casing 44 of the particulate filter module 14.

Still referring to FIG. 4, the gaseous filter module 16 has a casing 54 defining an enclosure, and an inlet and outlet 56, 58 communicating with this enclosure. The inlet and outlet 56, 58 are defined by opposed surfaces of the filter module 16, and preferably correspond to the entire area of these surfaces with the exception of the respective relatively small perimeter surface 56', 58' surrounding each of the inlet and outlet 56, 58.

The casing 54 of the gaseous filter module 16 defines an enclosure in fluid communication with the inlet and outlet 56, 58, and containing suitable adsorption filtration media 60. In a particular embodiment, the adsorption filtration media 60 includes granular or pelletized activated carbon within a cartridge, so that gaseous contaminants are adsorbed within the pores of the activated carbon. Other suitable adsorption filtration media may alternately be used.

Referring to FIG. 5, in another embodiment, two or more side-by-side gaseous filter modules 16 are provided (two being shown). Depending on the concentration of contaminants in the flow to be filtered, the volume of adsorption media (e.g. activated carbon media) may be, when contained in a single gaseous filter module 16, sufficiently heavy so as to become burdensome and/or dangerous to manipulate without the assistance of additional people and/or lifting equipment. It may accordingly be desirable to split the adsorption media into multiple gaseous filter modules 16 that can be individually manipulated. In contrast, since particulate filters using sheet membranes have a much lower weight to volume ratio than adsorption media cartridges, a particulate filter module 14 sized for a same flow may remain sufficiently light to be manipulated by a single person, and similarly splitting the particulate filtration media into multiple modules may thus have unnecessary and undesirable impacts such as increased manufacturing time and costs. Accordingly, for ease of manipulation, it may be desirable to have two or more gaseous filter modules 16 engaged to a single particulate filter module 14.

Accordingly, in a particular embodiment a face divider 62 is engaged to the casing 44 of the particulate filter module 14. The face divider 62 may be engaged to the casing 44 by being an integral part thereof (e.g. monolithic casing including the face divider), by being separately formed and then permanently affixed to the casing 44, or by being separately formed and then removably connected to the casing 44. The face divider 62 defines the perimeter surface 48' of the particulate filter module outlet 44. The face divider 62 further includes one or more divider surface(s) 48'' (one in the embodiment shown) extending across the open end of the enclosure defined by the outlet 44. The divider surface(s) 48'' thus divide the outlet 44 into a same number of openings as the number of gaseous filter modules 16 provided, and are sized and positioned to be able to sealingly engage adjacent ones of the gaseous filter modules 16.

The perimeter surface 56' surrounding the inlet 56 of each gaseous filter module 16 sealingly engages its respective portion of the perimeter surface 48' of the particulate filter module 14, as well as a respective portion of one divider surface 48''. The gaseous filter modules 16 all communicate with the enclosure of the particulate filter module 14; the entire flow exiting from the outlet 48 of the particulate filter module 14 is split and enters the adjacent inlets 56 of the gaseous filter modules 16. Each gaseous filter module 16 is independently sealingly engaged to the particulate filter module 14 through its engagement with its respective portion of the face divider 62.

It is understood that although in the embodiment shown the gaseous filter modules 16 are received on top of the particulate filter module 14, in an alternate embodiment the particulate filter module 14 could be received on top of the gaseous filter modules 16. More than two gaseous filter modules 16 may be provided, and an adequate number of divider surfaces 48" are provided to allow for an individual sealing engagement of each gaseous filter module 16. When two or more divider surfaces 48" are provided, the divider surfaces 48" may be parallel to one another or cross each other, depending on the relative position of the gaseous filter modules 16.

It is also understood that the face divider 62 may be used to connect a single filter to multiple side-by-side filters in filter assemblies other than the assembly 10 shown.

Referring to FIGS. 6-7, a fan module 20 according to a particular embodiment is shown. The fan module 20 is detachable from the assembly 10, for example by being detachably connected to the exhaust module 18, which in the embodiment shown defines one exhaust duct 52 for each fan module 20 with each exhaust duct 52 being in fluid communication with an exhaust 64 of the assembly 10 (see FIG. 2).

The fan module 20 thus includes a casing 66 separate from the casings of the other modules. The fan module casing 66 has a filtration flow inlet 68, a cooling inlet 70, a filtration flow outlet 72 and a cooling outlet 74, and defines separate filtration and cooling flow paths $F_f$ and $F_c$, as can be more clearly seen in FIG. 7. The filtration flow path $F_f$ extends between and communicates with the filtration flow inlet 68 and outlet 72, while the cooling flow path $F_c$ extends between and communicates with the cooling inlet 70 and outlet 74. In the embodiment of FIG. 6, the filtration flow inlet 68, filtration flow outlet 72 and cooling outlet 74 are each defined by a respective single opening through the wall of the casing 66, while the cooling inlet 70 is defined by an array of openings through the wall of the casing 66. Other configurations may be used.

Referring to FIG. 7, the fan module 20 includes a rotatable filtration flow fan 76 received in the casing 66 in fluid communication with the filtration flow path $F_f$, e.g. including fan blades extending across the filtration flow path $F_f$. This fan 76 is sized and configured to drive the filtration flow $F_f$ through the filter modules 12, 14, 16, by "pulling" the flow therethrough. In a particular embodiment, the filtration flow fan 76 is a high pressure, tangential flow brushless blower with a centrifugal impeller. Other configurations may also be used.

The filtration flow fan 76 is drivingly engaged to a motor 78 also received in the casing 66, for example by being mounted to a shaft 80 forming part of or attached to a rotor of the motor 78.

The fan module 20 also includes a rotatable cooling flow fan 82 received in the casing 66 in fluid communication with the cooling flow path $F_c$ e.g. including fan blades extending across the cooling flow path $F_c$. This fan 82 is sized and configured to drive a cooling air flow for cooling components of the motor 78. The motor 78 is thus positioned such as to be in heat exchange relationship with the cooling flow path $F_c$, for example by being located in the cooling flow path $F_c$. In a particular embodiment, the cooling flow fan 82 is an axial fan. Other configurations may also be used.

In the embodiment shown, the cooling flow fan 82 is also drivingly engaged to the motor 78, for example by being mounted to the same shaft 80 as the filtration flow fan 76. It is however understood that alternately the cooling flow fan 82 may be drivingly engaged to a second motor, which may also be received within the casing 66 and be in heat exchange relationship with the cooling flow path $F_c$.

In the embodiment shown, the filtration flow path $F_f$ includes a filtration fan enclosure 84 containing the filtration flow fan 76. The filtration fan enclosure 84 has filtration flow inlet and outlets 68', 72' respectively communicating with the filtration flow inlet and outlet 68, 72 of the casing 66. For example, the filtration flow inlet and outlets 68', 72' may each be defined as a duct which respectively extends out of the filtration flow inlet and outlet 68, 72 of the casing 66. Since the filtration flow fan 76 is a centrifugal blower, the filtration flow inlet 68' is oriented axially with respect to the filtration flow fan 76, while the filtration flow exhaust 72' is oriented radially; other configurations may be used. When the filtration flow inlet and outlets of the filtration fan enclosure 84 are defined as ducts, membrane seals 86 (e.g. silicon or rubber membranes) are provided in the filtration flow inlet and outlet 68, 72 of the casing 66 around and in sealing engagement with the filtration flow inlet and outlet ducts 68', 72', respectively. Other suitable seals may alternately be used. Other configurations may also be alternately used; for example, the filtration flow inlet 68' can be defined as an opening through the filtration fan enclosure 84, i.e. without the need for an inlet duct extending from the filtration fan enclosure 84.

In the embodiment shown, the cooling flow path $F_c$ includes a cooling air inlet chamber 88, intake duct 92, cooling fan enclosure 90, motor enclosure 94, radial cooling exhaust duct 96 and exhaust plenum 100. The cooling air inlet chamber 88 is in fluid communication with the cooling air inlet 70. The cooling fan enclosure 90 contains the cooling flow fan 82 and communicates with the cooling air inlet chamber 88 through the intake duct 92, which extends from the cooling fan enclosure 90. A membrane seal 66 (or other suitable seal) is provided around the intake duct 92 within the opening of the cooling air inlet chamber 88 through which the intake duct 92 extends, to seal the engagement between the intake duct 92 and cooling air inlet chamber 88. The motor enclosure 94 contains the motor 78, and is disposed adjacent to and in communication with the cooling fan enclosure 90. The radial cooling exhaust duct 96 is disposed adjacent to and in communication with the motor enclosure 94. The cooling exhaust duct 96 is connected to the filtration fan enclosure 84, but is not in fluid communication therewith.

The casing 66 contains the cooling air inlet chamber 88, cooling fan enclosure 90, intake duct 92, motor enclosure 94 and cooling exhaust duct 96 as well as the filtration fan enclosure 84, and the free space around these elements defines the exhaust plenum 100. The cooling exhaust duct 96 includes a circumferential array of outlet orifices 98 communicating with the exhaust plenum 100, so as to discharge the cooling air therein. The cooling air outlet 74 of the casing 66 also communicates with this plenum 100 so that the cooling air can be discharged out of the fan module 20 therethrough.

It is understood that different configurations are possible for the fan module 20, for example the cooling flow path $F_f$, and that some elements may be omitted, added, or configured differently; for example, the location of the cooling flow fan 82 and/or motor 78 may be different than shown.

The cooling fan enclosure 90, intake duct 92, motor enclosure 94, cooling exhaust duct 96, filtration fan enclosure 84 (and filtration flow inlet and outlet ducts 68', 72', when provided) are interconnected to form a fan assembly 102 which is attached to the interior of the casing 66, for example using fasteners such as screws or bolts (not shown). A compression seal 104 (or other suitable seal) is provided between the inner surface of the casing 66 and the outer surface of the filtration fan enclosure 84, around the filtration flow inlet 68. The torque on the fasteners attaching the fan assembly 102 to the casing 66 is selected and applied with appropriate tools such as to provide adequate sealing while avoiding over-compression of the seal 104 and of the filtration fan enclosure 84; this can be performed by a qualified technician when the fan module 20 is manufactured, before the fan module 20 is installed in the filter assembly 10. Installation and removal of the fan module 20 in the filter assembly is independent of the compression seal 104, i.e. does not require a change of the compression forces on the seal 104.

In the embodiment shown, noise abatement material 106 such as acoustic foam is provided along the internal surfaces of the casing 66 and cooling air inlet chamber 88 in order to reduce the noise produced by the fan module 20. Alternately, the noise abatement material 106 may be omitted.

Referring to FIG. 8, the filtration flow exhaust duct 72' is sized and positioned for engagement with a complementary port 108 in the exhaust module 18, the perimeter of which is also surrounded by a membrane seal 66 (or other suitable seal) to provide for a sealing engagement of the duct 72' within the port 108. Installation of the fan module 20 thus requires insertion of the filtration flow exhaust duct 72' within the complementary port 102 of the exhaust module 18 (the membrane seals 66 ensuring a sealed connection), and connection of electric power for the motor(s) 78. The casing 66 of the fan module 20 can be attached to the exhaust module 18 or to another module of the filter assembly 10 through any adequate type of fastener, for example simple screws. The use of hoses and clamps in the connection of the flow paths as well as adjustment to the compression seal 104 are avoided. The fan module 20 can thus be installed or removed by the end user without requiring specialized tools and without the need for a specialized technician to perform the operation, which may reduce maintenance costs and/or downtime.

In a particular embodiment, the easy installation of the filter module(s) 20 moreover allow for the number of filter module(s) 20 on the assembly to be modified in the field, by the end user without requiring specialized tools and without the need for a specialized technician to perform the operation, for example when the flow requirements for the filter assembly 10 change. The filter module(s) 20 may thus allow for the filter assembly 10 to be upgradeable/expandable with respect to the number blowers and resultant airflow.

Although the filter assembly 10 has been shown with two fan modules 20, it is understood that more or less fan modules 20 may be provided. Moreover, the filter assembly 10 shown may be used with a single fan module 20, depending on the required flow through the filter modules; in this case, a dummy panel (not shown) or other suitable cover is provided over the unused port 108 of the exhaust module 18 to seal it.

It is also understood that the fan module(s) 20 may be used in filter assemblies other than the assembly 10 shown.

Referring back to FIG. 2, in a particular embodiment the filtration flow inlet 68 of each fan module 20 is spaced apart from the outlet 58 of the gaseous filter module 16, and communication therebetween is provided through a plenum 110 configured to diffuse the flow. When a blower is mounted directly adjacent an adsorption filter, the gases pulled through the filter are not distributed equally: there may be preferential loading in the form of a cone, with the tip of the cone at the blower inlet and the large portion of the cone at the opposed end of the filter. The adsorption media (e.g. activated carbon) is not used equally, which results in premature saturation within the cone. By contrast, in a particular embodiment, the flow diffusion occurring in the plenum 110 allows for a reduction or elimination of such preferential loading.

The cover 22 disposed over the gaseous filter module 16 and fan module(s) 20 defines this plenum 110, directing the flow between the outlet 58 of the gaseous filter module 16 and the filtration flow inlet 68 of each fan module 20 along a direction different from a direction of the flow through the fan module filtration flow inlet 68 and different from a direction of the flow through the gaseous filter module 16. In the embodiment shown, the flow is vertical or substantially vertical through the fan module filtration flow inlet 68 and through the gaseous filter module 16, and horizontal or substantially horizontal through the plenum 110 extending therebetween.

Referring to FIG. 9, the cover includes a bottom panel 112 (see also FIG. 2) with two circular holes 114 defined therethrough located and sized to be aligned with the fan module filtration flow inlet 68, and a large opening 115 located and sized to overlay the outlet 58 of each gaseous filter module 16 (two in the embodiment shown). In a particular embodiment, the bottom panel 112 is made of metal; other materials may alternately be used. Referring to FIG. 2, the plenum 110 is defined between the bottom panel 112 and a top wall 116 of the cover 22. The top wall 116 of the cover 22 is arcuate to help direct and turn the flow circulating through the plenum 110. Referring back to FIG. 9, in the embodiment shown the plenum 110 includes or is filled with a pleated noise reducing material 118 through which air can circulate.

In a particular embodiment, the cover 22 of the filter assembly 10 thus allow for the fan module(s) 20 to be disposed side-by-side with the filter modules 12, 14, 16 to minimize the height of the assembly 10, while providing for a diffusion of the flow therebetween allowing for a more distributed flow through the gaseous filter module 16, which reduces preferential loading.

It is also understood that the side-by-side configuration of the fan module(s) and filter and the flow communication through the plenum 110 may be used in filter assemblies other than the assembly 10 shown, including, but not limited to, filter assemblies including two or more gaseous filter modules 16, and filter assemblies including more filters, less filters, and different combination of filters.

The above description is meant to be exemplary only, and one skilled in the art will recognize that changes may be made to the embodiments described without departing from the scope of the invention disclosed. For example, each of the above described features, as well as any combination of two or more of the above described features could be used independently in a filter assembly. Still other modifications which fall within the scope of the present invention will be apparent to those skilled in the art, in light of a review of this disclosure, and such modifications are intended to fall within the appended claims.

The invention claimed is:

1. A filter comprising:
    a filter wall extending between first and second opposed ends, the filter wall being tubular and surrounding a filter cavity, the filter wall including filtration material permeable to air so that the filter cavity is in fluid communication with an environment of the filter through the filter wall;
    a filter inlet defined in the first end and in fluid communication with the filter cavity; and
    a tray extending within the filter cavity and freely rotatable within the filter cavity about an axis of rotation extending longitudinally within the filter cavity, the tray having a center of gravity offset from the axis of rotation, the tray being radially inwardly spaced from and in a contactless relation with the filter wall, the tray being radially outwardly spaced from the filter inlet.

2. The filter as defined in claim 1, wherein the axis of rotation corresponds to a central axis of the filter wall.

3. The filter as defined in claim 1, wherein the tray is cantilevered from the second end.

4. The filter as defined in claim 1, wherein the tray is removably connected within the filter cavity.

5. The filter as defined in claim 1, wherein the tray includes perforations.

6. The filter as defined in claim 1, wherein the tray defines a receiving cavity.

7. The filter as defined in claim 6, wherein the axis of rotation of the tray passes through said receiving cavity.

8. The filter as defined in claim 1, wherein the axis of rotation of the tray passes through the filter inlet.

9. The filter as defined in claim 1, wherein the filter wall is cylindrical.

10. The filter as defined in claim 1, wherein a rotational support is between the tray and the first and/or second opposed end of the filter, whereby the tray and the rotational support form a self positionable assembly under the action of gravity.

\* \* \* \* \*